(12) United States Patent
Edwards

(10) Patent No.: US 7,347,232 B2
(45) Date of Patent: Mar. 25, 2008

(54) LUMBER PROCESSING APPARATUS AND METHOD

(76) Inventor: Jerry L. Edwards, 87669 Highway 101, Florence, OR (US) 97439

( * ) Notice: Subject to any disclaimer, the term of this patent is extended or adjusted under 35 U.S.C. 154(b) by 0 days.

(21) Appl. No.: 11/421,356

(22) Filed: May 31, 2006

(65) Prior Publication Data

US 2006/0201582 A1 Sep. 14, 2006

(51) Int. Cl.
B27M 1/08 (2006.01)

(52) U.S. Cl. .................. 144/3.1; 144/4.2; 144/41; 144/246.1

(58) Field of Classification Search .............. 144/360, 144/367, 369, 356, 373, 3.1, 4.2, 4.8, 39, 144/2.1, 242.1, 335, 4.1, 357, 246.1, 377, 144/41; 83/468.1, 732, 425.3, 425.2, 425.4, 83/508.3
See application file for complete search history.

(56) References Cited

U.S. PATENT DOCUMENTS

| | | | | |
|---|---|---|---|---|
| 1,487,649 A * | 3/1924 | Foreman | ................... | 83/104 |
| 2,160,307 A * | 5/1939 | Cleveland | .............. | 144/250.18 |
| 2,876,815 A * | 3/1959 | Rogers | ................... | 144/356 |
| 2,938,552 A * | 5/1960 | Rogers | ................... | 144/4.8 |
| 3,811,353 A * | 5/1974 | Miles | ................... | 83/75.5 |
| 3,856,061 A * | 12/1974 | Miles | ................... | 144/357 |
| 4,023,605 A * | 5/1977 | Hellstrom et al. | ........... | 144/356 |
| 4,068,695 A * | 1/1978 | Seaman | ................... | 144/335 |
| 4,069,851 A * | 1/1978 | Bibler | ................... | 144/335 |
| 4,120,333 A * | 10/1978 | Hellgren et al. | ............ | 144/356 |
| 4,173,238 A * | 11/1979 | Pryor et al. | ................ | 144/356 |
| 4,185,672 A * | 1/1980 | Vit et al. | ................ | 144/357 |
| 4,325,421 A * | 4/1982 | Janovick et al. | ............ | 144/377 |
| 4,364,311 A * | 12/1982 | Platt, III | ................ | 100/6 |
| 4,378,035 A * | 3/1983 | Chisum | ................... | 144/1.1 |
| 4,947,909 A * | 8/1990 | Stroud | ................... | 144/357 |
| 5,142,955 A * | 9/1992 | Hale | ................... | 83/75.5 |
| 5,201,258 A * | 4/1993 | Cremona | ................ | 83/75.5 |
| 6,539,993 B1 * | 4/2003 | Starr | ................... | 144/340 |
| 2003/0183052 A1 * | 10/2003 | Olsen | ................... | 83/13 |
| 2004/0177896 A1 * | 9/2004 | McGehee et al. | ........ | 144/114.1 |

* cited by examiner

*Primary Examiner*—Bena Miller
(74) *Attorney, Agent, or Firm*—Blackwell Sanders LLP

(57) ABSTRACT

A method and apparatus are provided for processing rough cut lumber to convert the rough cut lumber into trimmed to length and dimensionally trimmed to form a standard piece of dimensioned lumber. The process and apparatus includes the formation of a plurality of columns of lumber pieces in addition to a one column operation mode. The lumber pieces in each of the columns are graded, indexed, measured for a trim to length, trimmed to length and then sorted by grade and trimmed length.

9 Claims, 5 Drawing Sheets

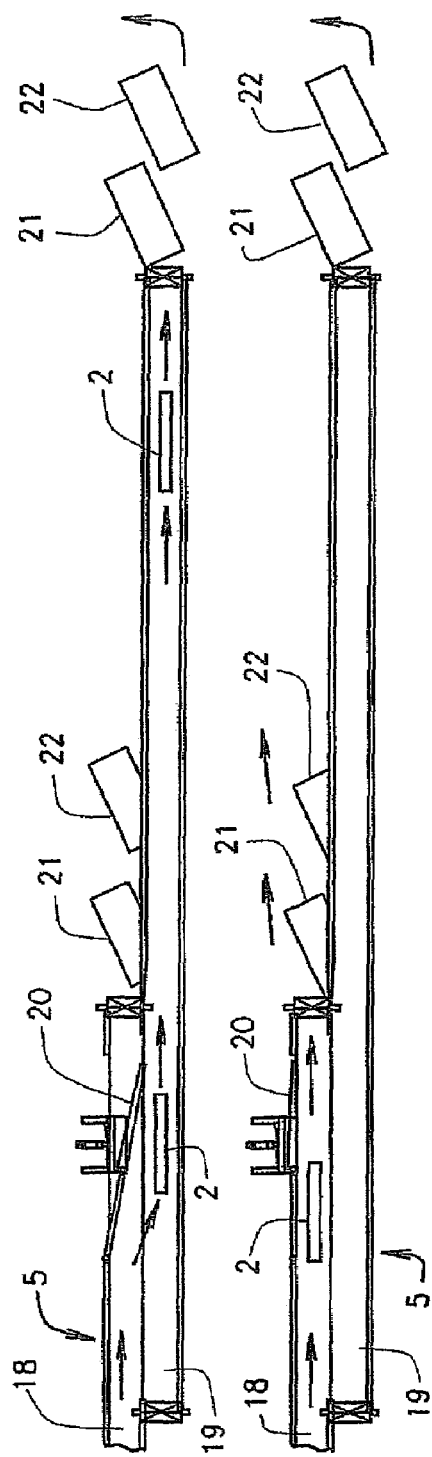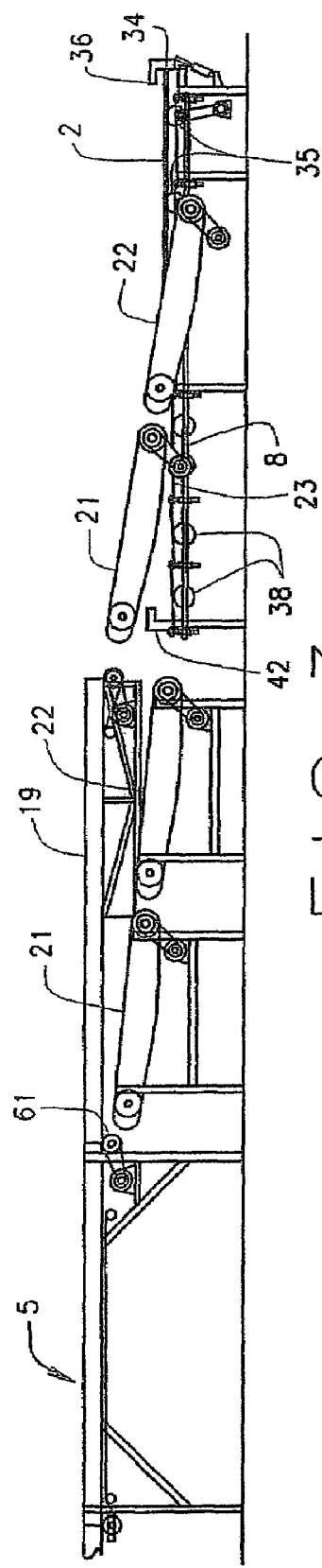

LUMBER PROCESSING APPARATUS AND METHOD

BACKGROUND OF THE INVENTION

So called dimension lumber is a common commodity. Dimension lumber is formed by cutting lumber pieces from a log to rough cut dimensions and then removing final stock to reduce the lumber pieces to standard cross-sectional dimensions. The dimensioned lumber stock is then typically cut to one of many standard lengths, for example, stud length, 8 foot, 10 foot, 12 foot, etc. to form finished lumber pieces. The final stock removal from the main longitudinal surfaces is typically done by a planer which involves the use of rotary cutting heads as is well known in the art. Rough cut lumber is supplied to a board finishing line that reduces the rough cut transverse dimensions to the final transverse dimensions, and then through a series of steps to a length cutting apparatus that cuts the semi-finished lumber pieces to length to form finished lumber pieces. Various processing stations are involved in the production line and are connected by conveyor systems.

To be efficient, such processing lines run the lumber pieces through at high speeds and through-put rates. The lumber pieces are slowed down from their high speeds through the stock removal step, particularly prior to reaching the grader, for grading and subsequent length trimming and sorting. Lumber is graded into various grades which grades may be relatively arbitrary or subjective or by a recognized standard. For example, five grades of wood may be provided wherein the grades are determined by the quality of the wood, e.g., the number of knots, the surface finish, grain, etc. One grade of wood is referred to as construction grade. Much dimension lumber is used in construction and has standard cross-sectional dimensions, for example so-called 2×4's, 2×6's, etc. Dimension lumber comes in standard lengths, for example, stud length, 8 foot, 10 foot, 12 foot, 14 foot, etc., up to and even sometimes exceeding 24 feet in length. Some lines are built to handle boards 30 feet and even longer. Longer lengths may be provided by joining multiple pieces of short dimension lumber together, for example, with glued finger joints.

In some processes, the cross-sectional dimensioning of the lumber pieces is done at very high movement speeds, for example, up to 4000 feet per minute through a stock removal device such as a planer. The dimensioned pieces are then removed from the stock removal device, and transferred to downstream processing equipment, but are first preferably slowed down prior to subsequent processing steps, particularly for grading at a grader station. Typically, a lumber processing line is simultaneously handling a large variety of lumber piece lengths, e.g., up to 24 feet, even though the largest quantity may be in the 8-14 foot length grouping. The grader station needs to be wide enough to accommodate the longest anticipated pieces even though much of the width is not needed all the time leading to operational inefficiency. Other downstream equipment must be equally wide to also handle the longest anticipated lumber pieces. Grading may be done manually by people and/or computer (or machine) vision techniques. The lumber pieces are then configured relative to one another prior to reaching a length trimming apparatus for subsequent trimming to length. The lumber pieces are trimmed to length preferably after the cross-section is dimensioned. One or both ends of a lumber piece may be cut in the length trimming station to obtain the desired length. When the processing system produces various trimmed lengths, e.g., 8, 10, 12 and 14-foot lengths concurrently, the trimmed length lumber pieces are then sorted by length and grade, bundled, bound, and then shipped.

Such lumber processing operations are well known.

However, even though such processing lines are effective, they do have some drawbacks. A particular drawback is that one or more portions of the processing apparatus present bottlenecks to through-put rates of processed lumber pieces. Operational inefficiencies are also encountered because much of the machine is frequently not being used but needs to be available to handle the longer lumber pieces. One significant bottleneck is the grader, particularly when the grader utilizes manual labor to effect grading. In manual grading, people may turn the boards, inspect all four sides (major longitudinal surfaces) and manually mark grade and trimming instruction designations on the board which are then subsequently read by machine vision with each piece of graded lumber's location within the processing system being known, along with its final cut to length. This information facilitates the sorting of the boards after trimming to length by both length and grade. While more people may be used to help speed up grading, there is a limited amount of space at a typical grading station, thereby placing an upper limit on the grading through-put rate. Grading stations are typically designed to simultaneously accommodate a full range of board lengths. To facilitate grading, the boards are aligned along one side of the machine, since, e.g., an 8-foot long board on a 24-foot wide grading station cannot be accessed except on one side of the grading station.

Lumber processing lines are expensive to purchase, to replace and/or modify. They also have an established footprint in a plant which footprint would also be difficult and expensive to change.

Therefore, there is a need to improve the processing of dimension lumber by improving the through-put rate of lumber pieces particularly at the grading station without requiring major changes in the existing equipment or the footprint occupied by the existing equipment to reduce capital expenditure to solve the problem and to allow simple retrofitting of existing lines.

SUMMARY OF THE INVENTION

The present invention involves the provision of an apparatus for finishing rough cut lumber pieces to form dimensioned lumber. The apparatus can include a stock removal device operable for removing stock from at least one major surface of a piece of rough cut lumber and preferably four major longitudinal surfaces. A first conveyor system is positioned to receive lumber pieces from the stock removal device and transfer them to downstream processing systems. An orienting device is provided that is associated with the first conveyor system and has opposite first and second flow paths or sides. The first side is aligned with a first discharge portion of the first conveyor system to receive a first stream of lumber pieces, and the second side is aligned with a second discharge portion of the first conveyor system to receive a second stream of lumber pieces from the first conveyor system. A length trimming apparatus is provided to cut each lumber piece to a predetermined length if cutting is needed. A sorter is provided downstream of the trimming device and is operable to receive trimmed dimensioned lumber pieces and sort the received trimmed lumber pieces by length and also preferably grade. The apparatus can use existing processing line components and by the addition of a new first conveyor system, permit inexpensive retrofitting to improve apparatus through-put rate.

The present invention also involves the provision of a method of processing lumber pieces of different lengths, the method can include removing stock from a plurality of lumber pieces to provide the desired transverse dimensions to produce dimensioned lumber pieces. The lumber pieces are discharged in a plurality of streams of lumber pieces with there being at least a first stream and a second stream. The lumber pieces in each stream are indexed and referenced by machine location prior to feeding to a length trimmer. The lumber pieces are fed in at least two streams or columns to the length trimmer. The lumber pieces are trimmed to length, if needed, in the trimmer, with the lengths being predetermined lengths from a respective reference for each of the first and second sides of the trimmer. The trimmed lumber pieces are transferred to a sorter and then sorted by length and preferably grade. The thus sorted lumber pieces are bundled by length and preferably also grade.

BRIEF DESCRIPTION OF THE DRAWINGS

FIG. 2 are fragmentary plan views showing a first portion of the wood processing system of FIG. 1 showing details of a feed conveyor to the grader with the two views showing a diverter in different positions.

FIG. 3 is a fragmentary end elevation view of the apparatus of FIG. 1.

Like numbers throughout the various Figures designate like or similar parts and/or construction.

DETAILED DESCRIPTION

Figure 1:
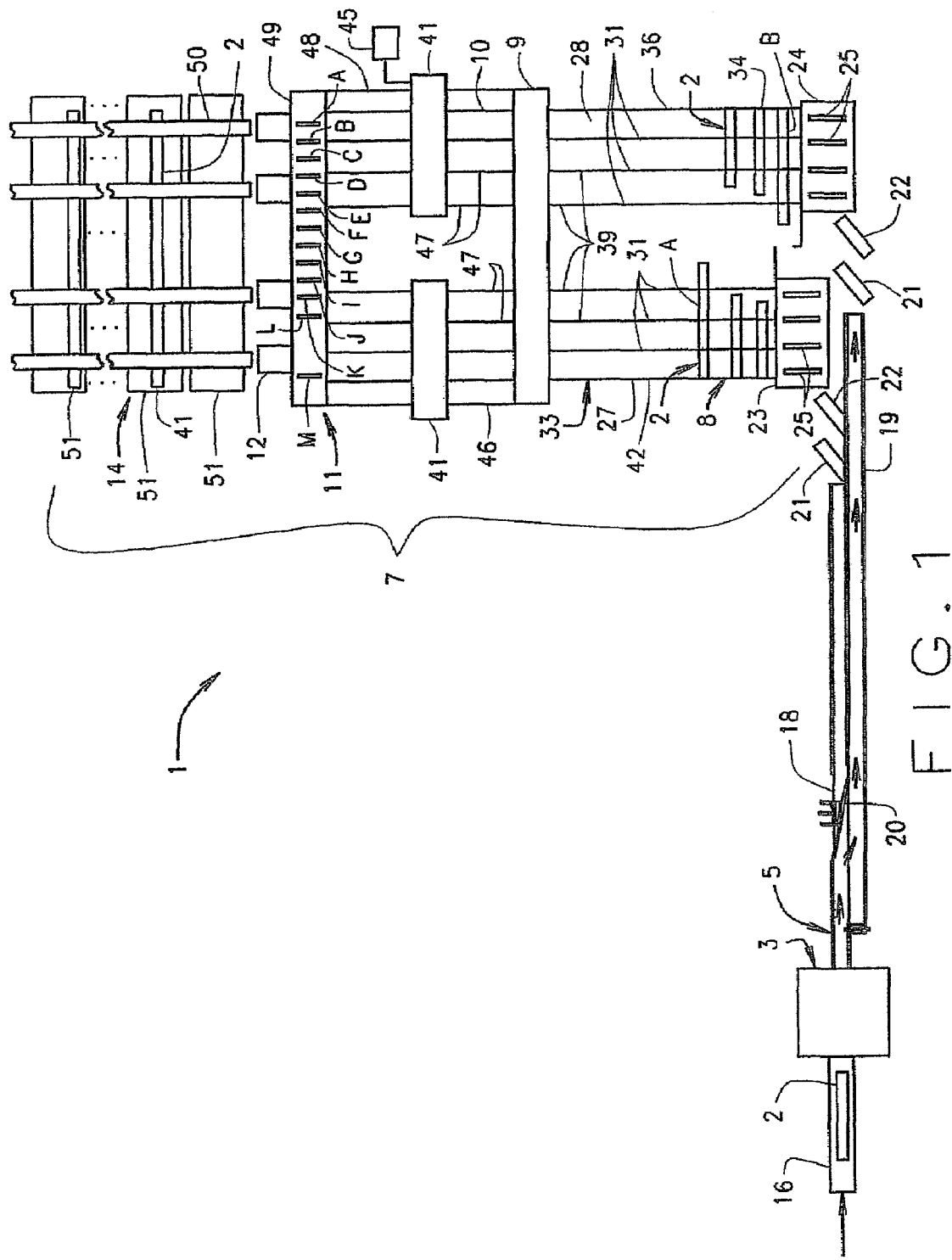
FIG. 1 is a schematic fragmentary top plan view of an apparatus for processing lumber pieces to produce dimensioned lumber pieces.
Figure 4:
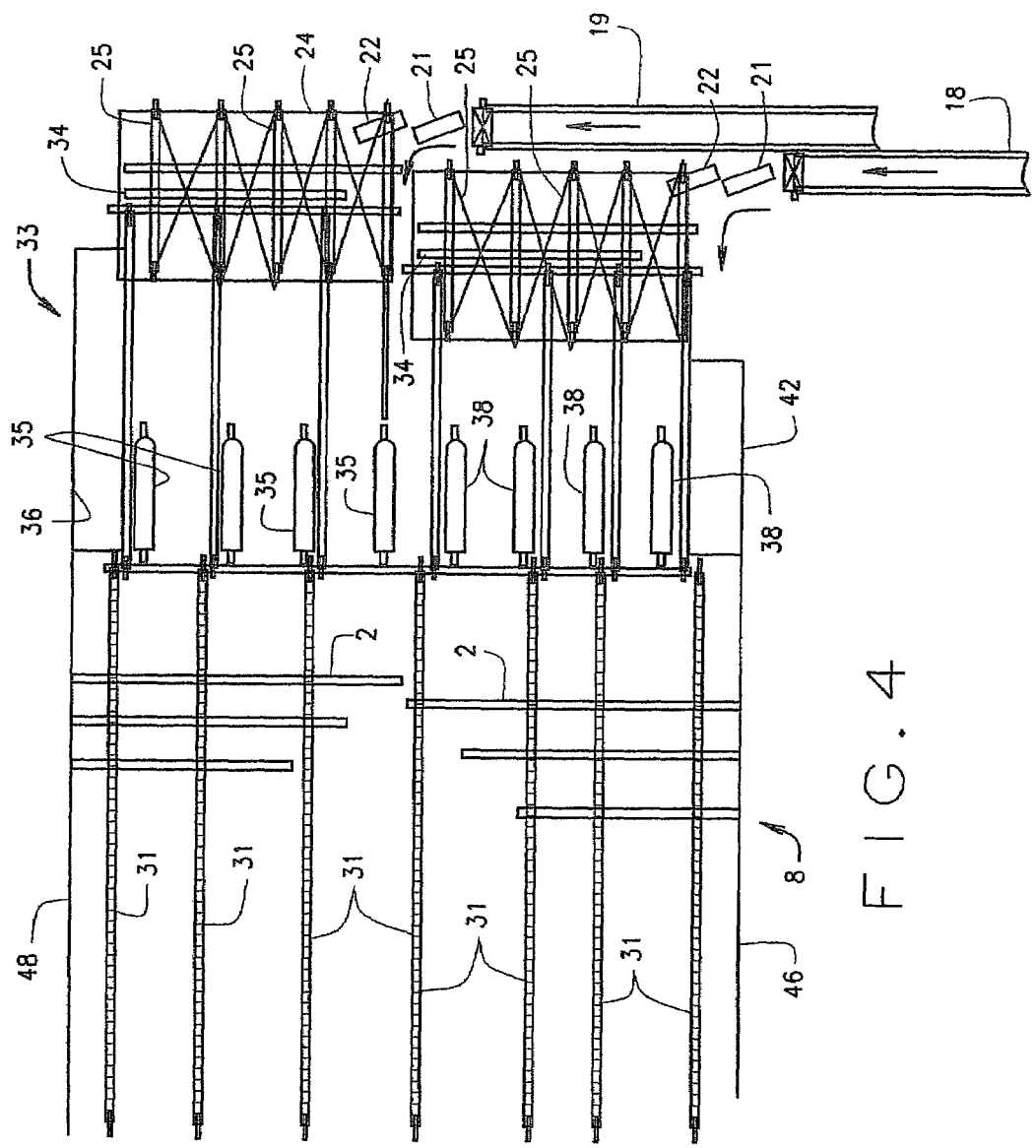
FIG. 4 is a fragmentary plan view of a grading station portion of the apparatus of FIG. 1.
Figure 5:
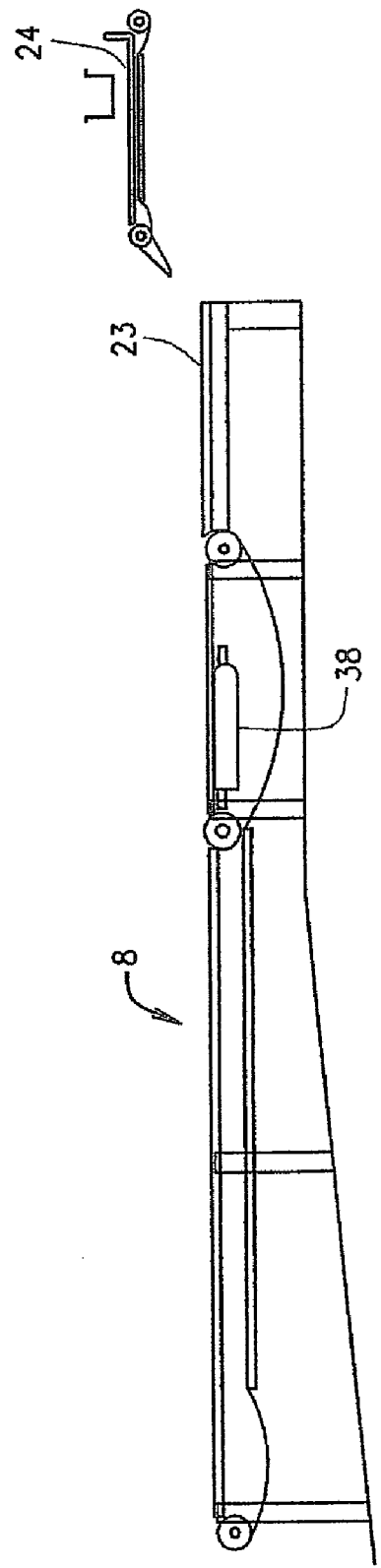
FIG. 5 is a fragmentary side elevation view of the portion of the apparatus portions as shown in FIG. 4.
Figure 7:
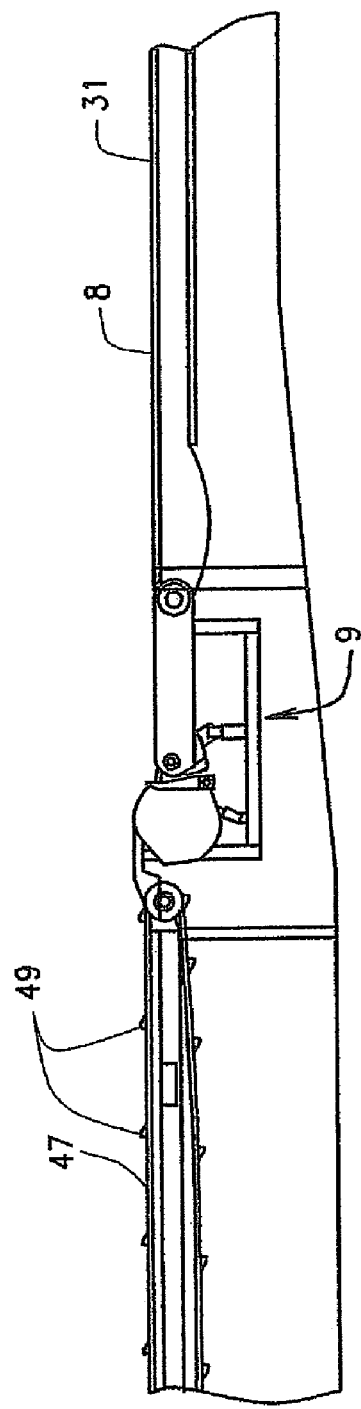
FIG. 7 is a fragmentary side elevation view of the apparatus portion shown in FIG. 6.
Figure 6:
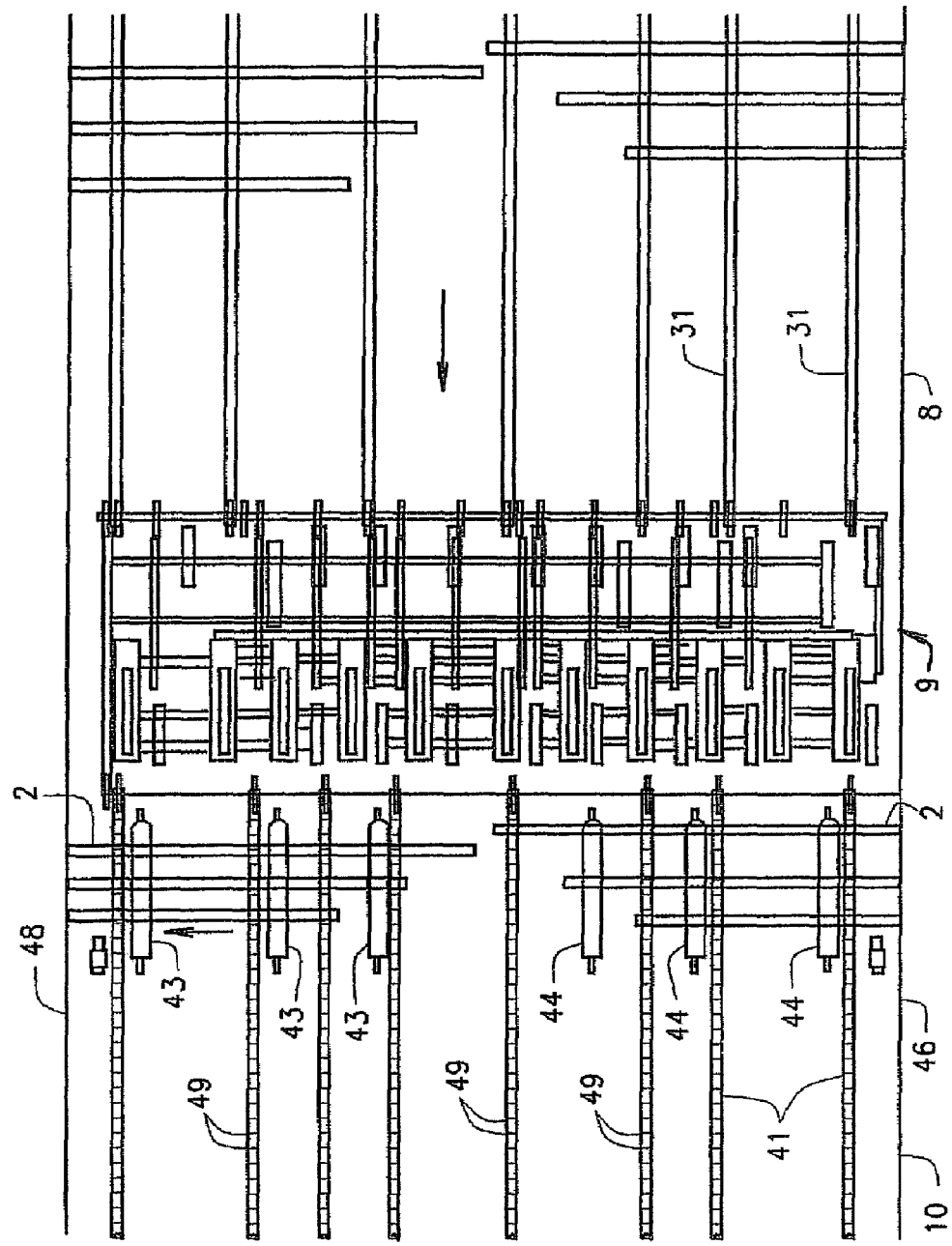
FIG. 6 is a fragmentary top plan view of a dealer portion of the processing line shown in FIG. 1.

The reference numeral 1 designates generally an apparatus operable for converting sawn or rough cut lumber pieces into dimensioned lumber pieces 2. Dimension lumber is typically considered to be standardized lumber. For example, a 2×4 or 2×6 of various lengths with the cross sectional shape and dimensions being relatively standard. By way of example, a 2×4 has actual dimensions of roughly 1½ inches by 3½ inches. The apparatus 1 includes a first stock removal station designated generally 3 that is operable for removing stock preferably from the four major longitudinal faces of a lumber piece 2, to reduce the cross-sectional size of the lumber piece to the desired stock dimensions and preferably to smooth the trimmed faces. The conveyor system 5 conveys the trimmed lumber pieces 2 from the trim station 3 to a downstream series of processing stations designated generally 7 that preferably includes a grader station 8, a dealer station 9, a transfer apparatus 10, a length trimming station 11 which cuts the dimensioned lumber pieces to desired lengths, another transfer station 12 that takes length trimmed dimension lumber pieces from the length trimmer 11 and transfers the lumber pieces 2 to a suitable sorter 14. The sorter 14 is operable to sort the dimensioned and length trimmed lumber pieces by length and preferably grade.

The apparatus 1 includes an in-feed conveyor 16 that conveys rough cut lumber pieces 2 to the stock removal station 3. The station 3 can be any suitable device that is operable to remove (trim) stock from one or more of the major longitudinal surfaces of the rough cut lumber pieces and preferably all four of the major surfaces. The station 3 can include any suitable device for removing stock from the rough cut lumber and in a preferred embodiment, the station 3 includes a plurality of rotating planer heads with each head adapted to engage a respective surface of the rough cut lumber pieces. The rotating heads are well known in the art and can rotate at very high speeds (angular velocity) to allow high speed through-put of the rough cut lumber pieces 2. Such planers are well known in the art. Although a planer can be used to trim the major longitudinal surfaces, other stock removal devices can be used so long as they leave the appropriate surface finish on the surfaces of the board or can be followed by a device to provide desired surface finish and not "burn" or blemish the wood as it is cut. For example, a circular saw blade can also be used if it can produce the desired surface finish at the desired speed. The station 3 has devices to align the lumber pieces 2 in relationship to the cutting devices. In high speed operation, the lumber pieces can move up to about 4,000 feet per minute as they exit the station 3. Some lumber pieces 2 may be processed as rough cut eliminating the need to trim the major surfaces but still need to be graded, cut to length and sorted. The trim station 3 may thus be eliminated or bypassed in this event.

At the output side of the trim station 3 or another feed device (not shown), a conveyor system 5 is provided. The conveyor system 5 is operable to receive cross sectionally dimensioned lumber pieces 2 from the station 3 and convey the lumber pieces to downstream processing equipment. The conveying system 5 includes at least two conveyor runs 18, 19 which are shown as being positioned in side-by-side relationships and preferably being generally coplanar at least from the station 3 to a directing device 20. The runs 18, 19 could also be arranged in superposed relationship. Each run 18, 19 may comprise its own sets of conveyor belts or the like, and are operable to provide at least two flowstreams or columns of dimension lumber pieces 2 from the trim station 3 as described below. A directing device 20 such as a gate diverter may be provided adjacent the upstream ends of the runs 18, 19 to shift each discharged lumber piece 2 to a desired conveyor run 18 or 19. In a preferred embodiment, alternating pieces of lumber 2 from the station 3 are fed down the runs 18 and 19 to provide an equal or substantially equal number of lumber pieces 2 to each of opposite sides of a grader 8 as described below or alternately, selectively to one side only of the grader. The runs 18 and 19 are similar in construction and preferably each is provided with at least one slowdown device and preferably a plurality of slowdown devices 21, 22. The slowdown devices 21, 22 may be diagonally directed conveyor belts which receive thereon a dimensioned piece of lumber 2 from the respective run 18, 19 or an upstream slowdown device to reduce the forward speed of the lumber piece 2 and then feed it to the downstream slow down device 22 for subsequent transfer to a respective landing table 23, 24 of the grader 8. As an example, the lumber pieces 2 from a conveyor 18, 19 will be slowed down by the first slowdown device 21 from high speed to medium speed and then slowed down by the second slowdown device 22, to slow speed and then be slowed down more upon transfer to the landing table 23 and then move generally transversely to the direction of travel along the conveyor system 5. The lumber pieces 2 from each of the runs 18, 19 are discharged onto a respective landing table 23, 24 and are then transferred to the grader 8 to move in a direction generally normal to the direction of movement of the lumber pieces 2 along the runs 18, 19 selectively in one or more columns. The apparatus 1 may be operated in a single run mode or a plurality of runs mode. In a single run mode, either the run 18 or 19 is utilized to feed lumber pieces to the grader 8 and in a plurality of runs mode, the runs 18, 19 both feed lumber pieces 2 to the grader 8 landing tables 23, 24. While the illustrated apparatus 1 is constructed for up to two columns in the grader 8, it may be constructed for more than two columns by adding more landing tables 23, 24 and more runs 18, 19. A lumber processing apparatus 1 may be made by retrofitting an existing apparatus with the conveyor system 5 to provide for selective two side operation.

In the illustrated structure, the dimensioned lumber pieces 2 exiting the run 18 are fed to a first side 27 of the grader 8 while the dimensioned lumber pieces 2 from the run 19 are fed to a second side 28 of the grader 8. As seen in FIGS. 1, 3, the landing table portion 23 is provided and is positioned in overlying relationship to the conveying system 33 such as parallel chains 31, which is part of the grader 8. The grader 8 orients the received lumber pieces 2 into an appropriate number of streams or columns A, B, e.g., one or two (or more if desired), and also generally aligns one end of each lumber piece 2 in each formed column preferably to an outer machine edge of the conveyor system 25. The lumber pieces 2 are positioned both transversely of the grader 8 and longitudinally of the grader 8. Lumber pieces 2 from the run 19 are fed to the landing table 24 and are discharged onto the conveyor system 33 on the side 28. The use of a slow down device the run 19 may be eliminated since a mechanical fixed stop may be used to configure the lumber pieces 2 on the side 28 as can friction between the lumber pieces and the landing table portion 24. Indexing rollers 35 receive lumber pieces 2 from the landing table 24 and by rotating clockwise as seen in FIG. 3, will move the outward end 34 of a lumber piece 2 against a stop 36 to transversely position the lumber piece 2 for downstream processing. The landing tables 23, 24 are provided with a conveyor system 25 to move the dimensioned lumber pieces generally at a right angle to the direction of movement from the runs 18, 19 for subsequent discharge onto the conveyor chains 31. Rollers 38 are provided for transversely positioning the lumber pieces 2 on the landing table 23 to the inside 27 for transverse alignment or registration on the grader 8. The rollers 38 are provided for receiving dimensioned lumber pieces 2 from the run 18 and landing table 23 and as seen in FIG. 3, would rotate counterclockwise and move received lumber pieces 2 to the side 27 to abut a stop 42 for transverse alignment or registration. The conveying system 33 can include a plurality of conveyor devices such as the chains 31 to advance the thus received dimensioned lumber pieces 2 from the landing tables 23, 24 forward through the grader 8. In the event the apparatus 1 is used in a single side or column grader mode, the rollers 38 could be used to move all received dimensioned lumber to the side 27. Alternatively, the rollers 35 could also be rotated counterclockwise (reversed) for single side operation.

In dual line use, the chains 31 advance the dimensioned lumber pieces 2 in two columns positionally indexed at outside ends through the grader 8 at stops 36, 42. In the grader 8, the lumber pieces 2 are preferably inspected either manually by people, or by machine vision to determine the grade and trim criteria of each of the dimensioned lumber pieces 2 and provide a cut to length. In a preferred embodiment, the lumber pieces 2 are marked with a marking that is machine readable to indicate the grade and preferably trim coding. Trim coding can be used to provide instructions to the trim station 11 what parts of a lumber piece need to be removed, e.g., a knotty portion to improve grade. Manual grading of the lumber pieces 2 may involve turning of the pieces to view each of the major longitudinal surfaces. After passing through the grader 8, the dimensioned and graded lumber pieces 2, which are oriented generally transversely to the direction of travel, are fed through a device, referred to as a dealer 9. Sensors, such as microswitches or optical sensors can be used to provide overall length information about a lumber piece 2 to the trim station 11 which information is preferably coordinated with the trim coding as is known in the art.

The dealer 9 preferably accomplishes at least two functions. The first function is to separate (space apart) and sequence the lumber pieces 2 and second, indexes the location of each individual lumber piece 2 on downstream conveyors such as conveyor 10. A signal is provided to a computer system 45 to indicate the trim length, grade and position of each individual lumber piece 2. The transfer conveyor 10 maintains the machine location of each individual lumber piece 2 which positions are known by a computer system 45, e.g., a PLC that stores information regarding each lumber piece 2 location, its estimated actual length and will compute a trim to length for each lumber piece 2 at each machine location. An acceptable computer system 45 includes a ControlLogix PLC, PanelView Plus operator console with PowerFlex series frequency driver by Allen-Bradley. The drives and remote I/O can be controlled over DeviceNet. Readers 41 are provided, for each column of dimensioned lumber pieces 2. In one column operation, only one reader 41 is needed. To retrofit an existing apparatus for processing a plurality of columns of lumber pieces 2, additional readers 41 may be added. Each dimensioned lumber piece 2 is preferably marked in the grader 8 by a worker or by machine with a grade designation, trim instructions and its machine location which information is stored in the computer 45. The actual length may be determined, e.g., by any suitable sensor preferably located adjacent the entrance to the trim station 11 and may be incorporated in the readers 41, if desired, after the machine location is known. The computer determines a trim to length for each lumber piece 2 which is also stored in the computer 45 and is referenced to the lumber pieces 2 machine location. A particularly effective dealer 9 can include a tong loader which removes lumber pieces 2 from the grader 8 and transfers them to the transfer conveyor 10 with the pieces being fixed in machine location by cleats 49 on the conveyor chains 47. Rollers 43, 44 are provided to ensure that at least one end of each lumber piece 2 is end aligned or registered to assist in the length trimming step. The rollers 43 move the lumber pieces 2 to an outside guiderail 48 while the rollers 44 move lumber pieces in the other column to an inside guide rail 46. The transfer conveyor 10 then moves the indexed lumber pieces 2 to the trim or cut off station 11.

The trim station 11 will have a plurality of transversely spaced cutting devices A-M, e.g., circular saw blades mounted therein selectively movable into engagement with a particular dimensioned lumber piece 2. The computer 45 provides a signal to a cutting head 49 and indicates which cutting devices A-M are to be moved for engagement with a particular lumber piece 2 as indicated by its trim to length criteria or other trim instructions stored in the computer 45. Indexing of the lumber pieces 2 by machine location is maintained by the trim station 11 in both columns of lumber pieces 2. For example, if the computer 45 indicates that a lumber piece 2 is to be trimmed to an 8 foot length, saws A and E may be moved into cutting engagement with the lumber piece 2 while if the computer 45 indicates that the piece is to be a 10 foot piece, saws A and F would be moved into cutting engagement with the lumber piece 2. The trimmed end or ends or mid portion from each lumber piece 2 is/are then removed for subsequent processing, as for example conversion into chips or the like or as a fuel source. The machine location of each trimmed to length lumber piece 2 is maintained and known by the computer 45 after the cut lumber pieces are transferred by the transfer conveyor 12 to a sorter 14. The transfer conveyor 12 may be inclined upwardly to elevate the lumber pieces 2 for sorting and depositing by sorter 14. Tipples, as are known in the art, may be provided at desired locations, e.g., at the dealer 9, to permit ejecting a lumber piece 2 from the apparatus 1 and possibly reinserting a subjected lumber piece for further processing.

A preferred sorter 14 is an under conveyor bin sorter that has a plurality of spaced bins 51 positioned under the conveyor 50. Many types of sorters 14 are well known in the art. When a particular lumber piece 2, designated by its length and grade, passes to an appropriate bin 51 (one assigned to receive lumber pieces of a particular combination of length and preferably grade), support arms, not shown, move upwardly opening the top of a selected bin 51 wherein the lumber piece 2 is deposited into the bin 51 by gravity. Depositing in a bin 51 continues until an appropriate number of cut pieces, e.g., 208, are contained in the bin 51 as monitored by computer 45 after which the bin contents are emptied for binding in a bundle once a predetermined number of pieces 2 are accumulated. In a hypothetical operation, if there are four lengths and five grades, at least twenty bins 51 would be provided, one for each combination of length and grade. Additional bins 51 however would preferably be provided to provide time for emptying of a bin 51 by providing an alternate bin as controlled by computer 45 for a particular grade and length of lumber pieces. In the event a bin 51 is full, the computer 45 will assign a new bin 51 to receive a particular grade and length of trimmed to length lumber pieces 2. In other words, a bin 51 over a long period of operation could be used to accumulate and discharge various lengths and grades as set up by the computer 45.

The apparatus 1 as described above can be used in two modes, a multiple column mode and a single column mode. In a single column mode, the run 19 and directing device 20 would be deactivated as with a decoupler 61 as would its landing table 24. All lumber pieces 2 exiting the trim station 3 would be sent down one run, e.g., run 18 and processed by moving in one column down one side of the grader 8 and then would be processed as described above by indexing, trimming to length and sorting. Typically, in a lumber mill, the lumber pieces 2 are being fed through in random lengths but having a relatively uniform cross section. Thus, for a typical processing line, it can accommodate lumber pieces up to 24 feet in length when used in a single column mode. When used in a multiple column mode, both sides of the grader 8 are utilized which allows faster grading because two sides can be used to effect the grading manually or by machine increasing the through-put rate significantly. The decoupler 61 may be operably connected to drive devices for the various conveyers downstream of the landing tables 23, 24 and other equipment like the dealer 9 and trim station 11 to selectively operate them in single column or multiple column modes. It has been found, by calculation, an increase in through-put rates of about 50 percent can be accomplished for manual grading. This also allows an increase in the operating speed of the stock removal station 3 allowing the lumber pieces 2 to move through at a faster speed during dimensioning and along the conveyors 18, 19 also permitting an increase in through-put rate for the apparatus 1. In dual column mode, a full length board, for example a 24 foot board is preferably not processed, only shorter lengths of lumber pieces will be processed to achieve manual grading. For example, in a 24 foot wide grading station, lumber pieces up to about 12 feet long, or even longer if desired, could be processed in dual columns. Longitudinal or machine direction staggering of the boards as they pass through the grader 8 though could permit lumber pieces 2 in excess of one half of the width of the grader 8 to be processed.

To process unfinished lumber pieces 2, the trimmer 11 may be bypassed or eliminated.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations, and other uses and applications of the present construction will, however, become apparent to those skilled in the art after considering the specification and the accompanying drawings.

The invention claimed is:

1. An apparatus for finishing cut lumber, said apparatus including;
   a feed device operable for feeding cut lumber pieces having a generally rectangular cross section;
   a first conveyor system positioned to receive lumber pieces from the feed device and provide a plurality of streams of lumber pieces said first conveyor system having a first discharge portion with a first run and a second discharge portion with a second run;
   an orienting device associated with the first conveyor system having opposite first and second sides, said first side being aligned with the first discharge portion of the first conveyor system to receive a first said stream of said lumber pieces, said second side being aligned with the second discharge portion of the first conveyor system to receive a second said stream of lumber pieces, the orienting device including a second conveyor system operable to receive lumber pieces from the first and second runs, the second conveyor system including at least two indexers each adapted to move lumber pieces in a direction generally along their length from a respective first or second run to an indexed machine location and form a plurality of indexed streams of lumber pieces in the orienting device, said second conveyor system having a portion operable to transport lumber pieces in a direction generally normal to the longitudinal axis of each of the lumber pieces;
   a trimming apparatus downstream of the orienting device and operable to cut oriented lumber pieces from the orienting device to a predetermined length; and
   a sorter downstream of the trimming apparatus operable to receive trimmed lumber pieces and operable to sort the received trimmed lumber pieces by at least length.

2. The apparatus of claim 1 including a diverter associated with the first conveyor system and operable to selectively direct lumber pieces from the feed device to the first run of the first conveyor system or the second run of the first conveyor system.

3. The apparatus of claim 1 including an indexing third conveyor operable to convey lumber pieces from the orienting device to the trimming apparatus and a computer operable to know a machine location of each lumber piece in the third conveyor said third conveyor operable to transport the lumber pieces in a direction generally normal to the longitudinal axis of each of the lumber pieces.

4. The apparatus of claim 3 including a sensor associated with each said indexed stream and operable to provide a signal indicative of the length of each lumber piece in each said indexed stream to the computer, said computer being operable to know the length of each lumber piece by its machine location and instruct the trimming apparatus how long to cut each said lumber piece to by machine location of the lumber piece.

5. The apparatus of claim 4 including a sensor associated with each said indexed stream and operable to provide a signal to the computer indicative of grade of each said lumber piece by machine location.

6. The apparatus of claim 5 wherein the computer is operable to provide a signal to the sorter indicative of the length and grade of each lumber piece by machine location wherein the sorter is operable to sort lumber pieces by length and grade.

7. The apparatus of claim 1 wherein the feed device including a stock removal device operable for removing stock from at least one major longitudinal surface of each of said lumber pieces.

8. The apparatus of claim 1 wherein the first and second discharge portions being operable to move the lumber pieces in a direction generally along the longitudinal axis of each said lumber piece.

9. The apparatus of claim 8 including a fourth conveyor system operable to receive lumber pieces from the trimming apparatus and convey the received lumber pieces to the sorter in a direction generally transverse to the longitudinal axis of each said received lumber piece.

* * * * *